United States Patent
Schumacher et al.

(10) Patent No.: US 12,522,167 B2
(45) Date of Patent: Jan. 13, 2026

(54) CONTROL DEVICE FOR A PERSONAL PROTECTION SYSTEM

(71) Applicant: Robert Bosch GmbH, Stuttgart (DE)

(72) Inventors: Hartmut Schumacher, Freiberg (DE); Matthias Siemss, Gomaringen (DE); Roman Vasylenko, Reutlingen (DE); Thorsten Koepke, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 203 days.

(21) Appl. No.: 18/552,580

(22) PCT Filed: May 30, 2022

(86) PCT No.: PCT/EP2022/064590
§ 371 (c)(1),
(2) Date: Sep. 26, 2023

(87) PCT Pub. No.: WO2023/274642
PCT Pub. Date: Jan. 5, 2023

(65) Prior Publication Data
US 2024/0174193 A1  May 30, 2024

(30) Foreign Application Priority Data
Jul. 1, 2021 (DE) .................... 10 2021 206 946.0

(51) Int. Cl.
*B60R 21/01* (2006.01)
(52) U.S. Cl.
CPC .... *B60R 21/01* (2013.01); *B60R 2021/01068* (2013.01)

(58) Field of Classification Search
CPC .................. B60R 21/01; B60R 21/017; B60R 2021/01054; B60R 2021/01061; B60R 2021/01068
See application file for complete search history.

(56) References Cited

FOREIGN PATENT DOCUMENTS

| DE | 102007012463 A1 | 9/2008 |
|---|---|---|
| DE | 102019210706 A1 | 1/2021 |

(Continued)

OTHER PUBLICATIONS

International Search Report for PCT/EP2022/064590, Issued Oct. 27, 2022.

*Primary Examiner* — Donald J Wallace
*Assistant Examiner* — Alex B Griffin
(74) *Attorney, Agent, or Firm* — NORTON ROSE FULBRIGHT US LLP

(57) ABSTRACT

A control device for a personal protection system. The system includes at least one main processor, to generate and output at least one trigger signal for at least one trigger element of a personal protection device of the personal protection system as a function of trigger-relevant information, a central safety circuit with an auxiliary processor, to generate and output at least one enable signal for the at least one trigger element of the personal protection device as a function of the trigger-relevant information, an integrated main system circuit, to generate and output, as a function of the at least one trigger signal and the at least one enable signal, at least one actuation signal for triggering the at least one trigger element of the personal protection device, and at least one control device data bus, via which the main processor communicates with the other components of the control device.

15 Claims, 5 Drawing Sheets

(56) References Cited

FOREIGN PATENT DOCUMENTS

| | | | | |
|---|---|---|---|---|
| EP | 1970262 A2 | * | 9/2008 | ......... B60R 21/0132 |
| JP | 2007069711 A | | 3/2007 | |

* cited by examiner

CONTROL DEVICE FOR A PERSONAL PROTECTION SYSTEM

FIELD

The present invention relates to a control device for a personal protection system.

BACKGROUND INFORMATION

The related art describes personal protection systems in the form of airbag systems with a control device which is connected to a vehicle data bus, such as for example a CAN (Controller Area Network) data bus, FlexRay data bus etc. In this case, the connection to the vehicle data bus is used for diagnostic purposes, behavior optimization and transmission of sensor data from the airbag system to other vehicle systems, such as for example an ESP (Electronic Stability Program) system and/or ABS (Anti-lock Braking System) system. The transmission of general data such as date, time, temperature, speed, load; usage statistics; battery management; rain sensor; ESP/ABS interventions etc. to the control device of the airbag system serve in optimization and documentation but have no direct effect on a trigger decision. Since the control device has non-volatile memory capabilities even if the battery is severed, in the case of a crash or in other defined situations (near misses) both passenger restraint system data and data from other vehicle systems which contribute to the status and operation of the vehicle before, during and after the crash are transmitted to the control device of the airbag system for storage. Furthermore, control devices for personal protection systems are described in the related art which, for reasons of redundancy and diversity, use an additional lower-power processor for safety and/or authentication tasks in addition to a main processor.

German Patent Application No. DE 10 2007 012 463 A1 describes a control device and a method for actuating personal protection means. In this case, the personal protection means are actuated by a processor as a function of at least one sensor signal. Furthermore, a safety controller is provided which enables actuation as a function of the at least a sensor signal. A module formats a bus signal originating from outside a control device, which bus signal has at least one sensor signal, for the safety controller and provides the formatted signal.

SUMMARY

A control device for a personal protection system having features of the present invention may have an advantage of providing, for the growing market in vehicles with driver assistance systems, an optimized concept for still higher performance personal protection systems which is capable of taking into account trigger-relevant information from driver assistance systems, such as for example from video evaluation, radar evaluation, lidar evaluation etc. or indeed from other systems, such as for example ESP and/or ABS systems, when making trigger decisions relating to personal protection means (i.e., personal protection devices), such as for example airbags, seatbelt tensioners, etc. In addition, embodiments of the control device may also assume further safety tasks, such as for example the isolation of high-voltage derivatives in electromobility applications of up to 800 V.

In some example embodiments of the control device of the present invention, a central integrated safety circuit with an auxiliary processor may, through passive monitoring of data transmitted on different vehicle data buses (LIN (Local Interconnect Network); CAN; CAN-FD; FlexRay, Ethernet; Bluetooth etc.), identify more complex trigger-relevant information in the passively monitored data and provide corresponding algorithms for evaluating the trigger-relevant information. Based on the evaluation of the trigger-relevant information, the central safety circuit may enable complete or partial access to personal protection means or to groups of personal protection means for triggering purposes, so that a main processor may bring about triggering of the enabled personal protection means at the precise activation time. Furthermore, interaction of main processor and auxiliary processor of the central safety circuit may wholly prevent use of flash memories in a start phase when the personal protection system is not active. Safety-relevant plausibility checks may also be performed by the auxiliary processor of the central, integrated safety circuit for data which the control device wishes to provide on a corresponding vehicle data bus by way of the main processor. In addition, the safety concept of the personal protection system may be simply adapted to future requirements by modifying the software.

Some example embodiments of the present invention provide a control device for a personal protection system which comprises as its components at least one main processor, which is embodied to generate and output at least one trigger signal for at least one trigger element of personal protection means of the personal protection system as a function of trigger-relevant information, a central safety circuit with an auxiliary processor, which is embodied to generate and output at least one enable signal for the at least one trigger element of the personal protection means as a function of the trigger-relevant information, an integrated main system circuit, which is embodied to generate and output, as a function of the at least one trigger signal and the at least one enable signal, at least one actuation signal for triggering the at least one trigger element of the personal protection means, and at least one control device data bus, via which the main processor communicates with the other components of the control device. In this case, the central safety circuit comprises at least one external bus interface, via which the main processor communicates with at least one external vehicle data bus, and at least one internal bus interface, which is connected to the at least one control device data bus. The trigger-relevant information is transmissible via the at least one control device data bus and/or the at least one external vehicle data bus, the at least one external bus interface and the at least one internal bus interface being in each case embodied to passively monitor the data communicated via the at least one external vehicle data bus or the at least one control device data bus and to identify the trigger-relevant information and additionally transfer it to the auxiliary processor for evaluation.

In some example embodiments of the control device according to the present invention, the central integrated safety circuit, which comprises at least one external bus interface for identifying trigger-relevant information in data from at least one vehicle bus system, may be adapted to and aligned with requirements without taking account of the trigger architecture for the personal protection means in the integrated main system circuit. The additional auxiliary processor in the central safety circuit makes it possible to evaluate complex and different vehicle bus data. Likewise, complex safety algorithms for central sensors arranged in the control device or peripheral sensors connected to the control device via peripheral sensor interfaces may be represented by software.

The personal protection means may, for example, be internal passenger protection means, such as airbags, seatbelt tensioners, crash-active headrests, insertable seat components, such as side bolsters, roll bars etc. and also external pedestrian protection means, such as airbags, crash-active hood etc. Active personal protection means, such as for example brake interventions or vehicle dynamics control interventions are also possible, however. The term actuation hereinafter means activation of these personal protection means, that is to say for example in the case of personal protection means with pyrotechnical trigger elements, such as airbags, corresponding priming charges are caused to ignite by energization. In the case of personal protection means with electromagnetic trigger elements, such as for example roll bars, the electromagnetic device is activated by an activation current.

According to an example embodiment of the present invention, trigger-relevant information may be acquired physical variables which are acquired by different sensors, such as acceleration sensors, air pressure sensors, structure-borne noise sensors, or environment sensors or indeed may be provided by other vehicle systems, such as for example a vehicle dynamics control system or a braking system. Moreover, variables derived from the acquired physical variables are also possible, such that for example a filtered acceleration signal or an integrated acceleration signal can be evaluated as trigger-relevant information.

The central safety circuit is hereinafter understood to mean an integrated circuit module comprising the auxiliary processor, at least one external bus interface, at least one internal bus interface and further components. The integrated main system circuit is hereinafter understood to mean a "system ASIC module" which, in addition to other components, in particular comprises the widest possible range of driver circuits for activating the personal protection means.

Advantageous improvements of the control device for a personal protection system according to the present invention are made possible by the measures and further developments disclosed herein.

According to an example embodiment of the present invention, it is particularly advantageous for the integrated main system circuit to be further embodied to generate at least one internal system voltage of the control device. For instance, the integrated main system circuit may for example provide a buffered supply voltage from an energy reserve as well as further supply voltages for the main processor, the central safety circuit and other components of the control device.

According to the present invention, in one advantageous configuration of the control device, at least one integrated system circuit may be present as a further component of the control device and connected to the at least one control device data bus. In this case, the at least one integrated system circuit may be embodied to generate and output, as a function of the at least one trigger signal and the at least one enable signal, at least one further actuation signal to trigger at least one further trigger element of the personal protection means. Like the integrated main system circuit, the at least one integrated system circuit may be embodied as a system ASIC module comprising the widest possible variety of driver circuits for activating the further personal protection means. Unlike the integrated main system circuit, the at least one integrated system circuit does not generate any internal system voltages for the control device. By using the integrated main system circuit and further integrated system circuits, it is straightforwardly possible to form different groups of personal protection means and to activate them as a function of different trigger-relevant information. Furthermore, the integrated main system circuit and/or the at least one integrated system circuit may in each case comprise at least one peripheral sensor interface, which is embodied to receive and condition sensor signals from at least one peripheral sensor. In this case, the integrated main system circuit and/or the at least one integrated system circuit make the conditioned sensor signals available via the internal system data bus.

In a further advantageous configuration of the control device according to the present invention, the central safety circuit may comprise a flash memory-free memory device with at least one memory unit, which is embodied to store an internal self-testing system and/or bootloader program and/or program code received from the main processor on system startup and to provide a working memory for the at least one auxiliary processor. In this way, for example, a first memory unit may be embodied as a volatile working memory, and a second memory unit may be embodied for example as a volatile program data memory. A third memory unit may for example be embodied as a program code memory. In this case, program code may initially be transmitted securely from the main processor via the at least one control device data bus to the central safety circuit. The transmitted program code may initially be checked for correct content by integrated self-testing and locked against change in ongoing operation. Cyclic checking of the program code is optionally possible. Program data may also initially be transmitted securely from the main processor via the at least one control device data bus to the central safety circuit. Similarly, the transmitted program data may initially be checked for correct content by integrated self-testing and be locked against change in ongoing operation. Cyclic checking of the program data is optionally possible. In addition, a further non-volatile memory unit may store a "bootloader" programmed as a built-in mask, which, once started up by the main processor, assumes the task of handling acceptance of the program code and program data into the memory device of the central safety circuit.

In a further advantageous configuration of the control device according to the present invention, the at least one external bus interface may comprise a transceiver and a first passive monitoring function. The transceiver may be embodied to receive external data from the at least one external vehicle data bus and forward them to the main processor and to receive internal data from the main processor and forward them to the at least one external vehicle data bus. The passive monitoring function may be embodied to passively monitor the external data and the internal data and to identify the trigger-relevant information and forward it to the auxiliary processor. By integrating the at least one external bus interface with transceiver into the central safety circuit, it is possible to dispense with further external bus interface modules in the control device. If the vehicle has a plurality of different data buses via which trigger-relevant information is transmitted, then a plurality of external bus interfaces can be integrated into the central safety circuit. In addition, the central safety circuit may comprise a switch-off function, which is embodied to switch off the transceiver in the event of defined bus errors. This advantageously makes it possible to prevent corrupt or false data from being output by the control device to the corresponding vehicle data bus.

In a further advantageous configuration of the control device of the present invention, the at least one external vehicle data bus may be a wired data bus, in particular a CAN data bus or a FlexRay data bus or a LIN data bus or an Ethernet data bus, or a wireless data bus, in particular a Bluetooth data bus.

Corresponding physical transceivers may be integrated in the central safety circuit for direct connection to the respective vehicle data bus system.

In a further advantageous configuration of the control device of the present invention, the at least one internal bus interface may comprise a second passive monitoring function, which may be embodied to passively monitor the data on the at least one control device data bus and identify the trigger-relevant information and forward it to the auxiliary processor. In this way, the central safety circuit may also passively monitor the trigger-relevant information which is contained in sensor data from the peripheral sensors or in sensor data from the central sensors arranged in the control device and transmit it via the at least one control device data bus to the main processor.

In a further advantageous configuration of the control device of the present invention, the central safety circuit may comprise an autonomous cryptomodule, which may be embodied to perform an authentication check of the identified trigger-relevant information, redundantly relative to the main processor. This enables a redundant authenticity check, independently of the main processor, of the identified trigger-relevant information in the integrated main system circuit.

In a further advantageous configuration of the control device of the present invention, the central safety circuit may comprise an internal power supply, which may be embodied to generate at least one internal supply voltage for the central safety circuit from a reverse polarity-protected supply voltage and/or from a buffered supply voltage from an energy reserve. The internal power supply may for example comprise a plurality of linear controllers, which in each case generate an internal supply voltage and make it available to at least one external bus interface and/or the at least one internal bus interface and/or the memory device and/or the auxiliary processor.

In a further advantageous configuration of the control device of the present invention, the central safety circuit may comprise a sensor data filter module, which may be embodied to filter the trigger-relevant information based on sensor data in accordance with specifiable key data. The use of such a sensor data filter module makes it possible to implement adaptation to the data filters used in the field of personal protection systems with power-saving clocking, which is used for the auxiliary processor.

In a further advantageous configuration of the control device of the present invention, the central safety circuit may comprise a control circuit, which may be embodied to actuate a central semiconductor safety switch, in order to adapt a trigger voltage for the at least one trigger element in linear or clocked manner to the requirements of the at least one trigger element. In this way, the trigger voltage may for example be adapted before and/or during triggering, so as to reduce the losses in the driver circuits of the personal protection means by way of a fast pulse width modulation (PWM) interface. It is also possible to build a novel central, fast, high-efficiency, high-current buck controller with a short-time loading of 40 amperes into the trigger path. The control circuit may preferably be actuated and activated by the main processor.

In a further advantageous configuration of the control device of the present invention, the central safety circuit may comprise at least one parallel readback interface, which is embodied to output the at least one enable signal. This gives rise to an expandable partial or complete enable option for the personal protection means. Enabling may proceed for example by way of a suitable level preset and/or by transmission of a suitable, safe serial enabling word and optional comparison.

In a further advantageous configuration of the control device of the present invention, the central safety circuit may comprise at least one analog interface, which is embodied to receive or output at least one analog signal. Such an analog interface may be used, for example, to input switching states or locking states or to actuate warning lights.

Exemplary embodiments of the present invention are illustrated in the figures and explained in more detail in the following description. In the figures, the same reference signs are used to designate components or elements which carry out the same or similar functions.

DETAILED DESCRIPTION OF EXAMPLE EMBODIMENTS

Figure 1:
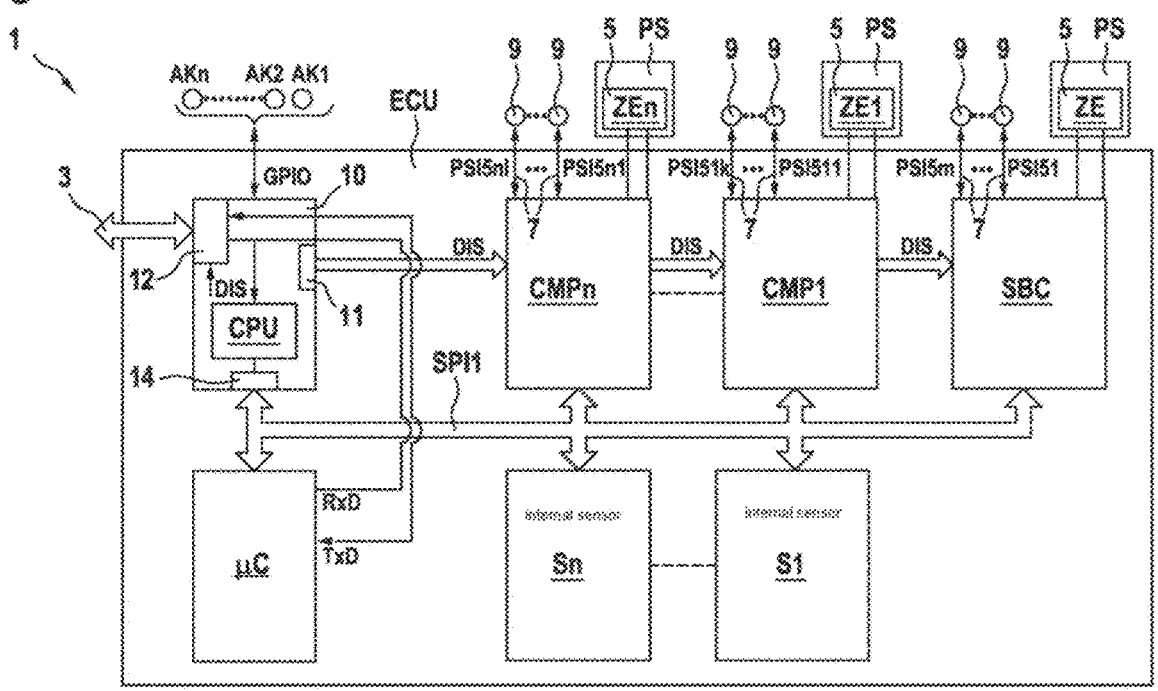
FIG. 1 shows a schematic block diagram of an exemplary embodiment of a control device according to the present invention for a personal protection system.

As is shown in FIGS. 1 to 7, the depicted exemplary embodiments of a control device ECU according to the present invention for a personal protection system 1 comprise as components at least one main processor μC, which generates and outputs at least one trigger signal for at least one trigger element 5 of personal protection means (i.e., personal protection device) PS of the personal protection system 1 as a function of trigger-relevant information, a central integrated safety circuit 10 with an auxiliary processor CPU, which generates and outputs at least one enable signal DIS for the at least one trigger element 5 of the personal protection means PS as a function of the trigger-relevant information, an integrated main system circuit SBC, which generates and outputs, as a function of the at least one trigger signal and the at least one enable signal DIS, at least one actuation signal for triggering the at least one trigger element 5 of the personal protection means PS, and at least one control device data bus SPI1, via which the main processor μC communicates with the other components of the control device ECU. In this case, the central integrated safety circuit 10 comprises at least one external bus interface 12, via which the main processor μC communicates with at least one external vehicle data bus 3, and at least one internal bus interface 14, which is connected to the at least one control device data bus SPI1, the trigger-relevant information being transmissible via the at least one control device data bus SPI1 and/or the at least one external vehicle data bus 3. In addition, the at least one external bus interface 12 and the at least one internal bus interface 14 in each case passively monitor the data communicated via the at least one external vehicle data bus 3 or the at least one control device data bus SPI1, identify the trigger-relevant information and transmit this additionally to the auxiliary processor CPU for evaluation.

As is further shown in FIG. 1, at least one integrated system circuit CMP1, CMPn is present as a further component of the control device ECU and connected to the at least one control device data bus SPI1. In this case, the at least one integrated system circuit CMP1, CMPn generates and outputs, as a function of the at least one trigger signal and the at least one enable signal DIS, at least one further actuation signal to trigger at least one further trigger element 5 of the personal protection means PS.

As is further shown in FIG. 1, in the depicted exemplary embodiment the depicted control device ECU comprises both the integrated main system circuit SBC and n further integrated system circuits, of which a first integrated system circuit CMP1 and an $n^{th}$ integrated system circuit CMPn are depicted, by way of example. In this case, both the integrated main system circuit SBC and the further integrated system circuits CMP1, CMPn are in each case embodied as ASIC modules (ASIC: application-specific integrated circuit). To activate associated personal protection means PS, in the depicted exemplary embodiment the integrated main system circuit SBC comprises a driver circuit (not described in any greater detail) with a trigger element 5 embodied as an ignition element ZE. To activate associated further personal protection means PS, in the depicted exemplary embodiment the first integrated system circuit CMP1 comprises a driver circuit (not described in any greater detail) with a trigger element 5 embodied as a first ignition element ZE1. To activate associated further personal protection means PS, in the depicted exemplary embodiment the $n^{th}$ integrated system circuit CMPn comprises a driver circuit (not described in any greater detail) with a trigger element 5 embodied as an $n^{th}$ ignition element ZEn. By using the integrated main system circuit SBC and the further integrated system circuits CMP1, CMPn, it is straightforwardly possible to form different groups of personal protection means PS and to activate them as a function of different trigger-relevant information.

In addition, in the depicted exemplary embodiment of the control device ECU, the integrated main system circuit SBC and the further integrated system circuits CMP1, CMPn in each case comprise at least one peripheral sensor interface 7, which receives and conditions sensor signals from at least one peripheral sensor 9. In the depicted exemplary embodiment, the peripheral sensor interfaces 7 in each case embodied as PSI5 interfaces PSI51, PSI5$m$, PSI511, PSI51$k$, PSI5$n$1, PSI5$nl$. As is further shown in FIG. 1, in the depicted exemplary embodiment the integrated main system circuit SBC is connected via m PSI5 interfaces PSI51, PSI5$m$ (of which a first PSI5 interface PSI51 and an $m^{th}$ PSI5 interface PSI5$m$ are depicted) to m sensors 9, just two of which sensors 9 are depicted. In addition, in the depicted exemplary embodiment the first integrated system circuit CMP1 is connected via k PSI5 interfaces PSI511, PSI51$k$ (of which a first PSI5 interface PSI511 and a $k^{th}$ PSI5 interface PSI51$k$ are depicted) to k sensors 9, just two of which sensors 9 are depicted. Furthermore, in the depicted exemplary embodiment the $n^{th}$ integrated system circuit CMPn is connected via l PSI5 interfaces PSI5$n$1, PSI5$lk$ (of which a first PSI5 interface PSI5$n$1 and an $l^{th}$ PSI5 interface PSI5$nl$ are depicted) to l sensors 9, just two of which sensors 9 are depicted.

Figure 2:
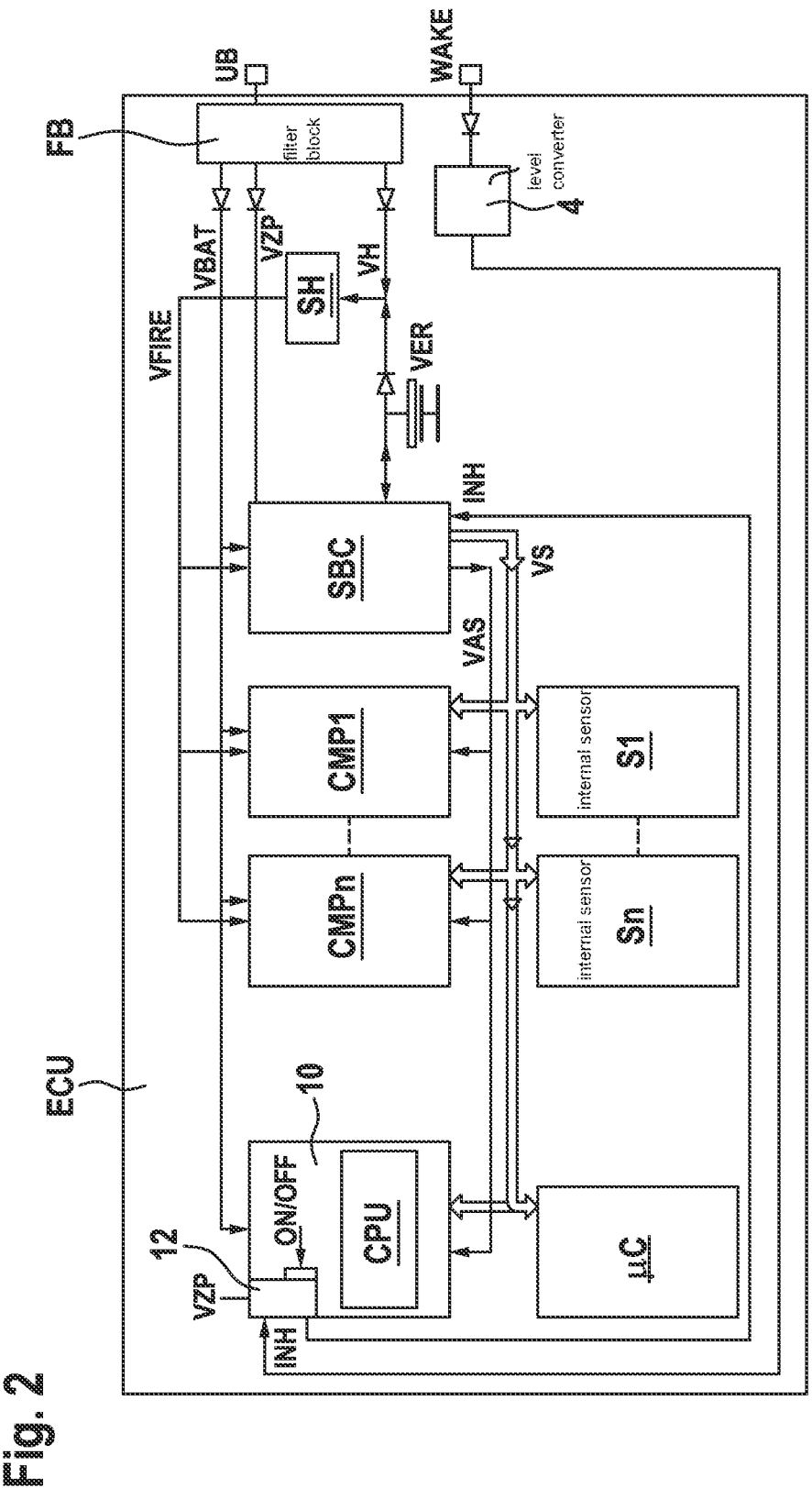
FIG. 2 shows a schematic block diagram of a power supply of the control device according to the present invention for a personal protection system from FIG. 1.

As is further shown in FIG. 2, a filter block FB receives a vehicle electrical system voltage UB and makes available a reverse polarity-protected supply voltage VBat which is applied to the central integrated safety circuit 10, to the integrated main system circuit SBC and to the further integrated system circuits CMP1, CMPn. In addition, the filter block FB makes available to the integrated main system circuit SBC a further supply voltage VZP, from which the integrated main system circuit SBC generates further internal system voltages VS, of which FIG. 2 shows and indicates, by way of example, a bundle of internal system voltages VS. These internal system voltages VS serve, for example, in supplying power to internal sensors S1, Sn of the control device ECU, the main processor μC (core, memory, ADC, interfaces e.g. SPI etc.) and in supplying interfaces for the internal data bus or buses (not depicted) in the further integrated system circuits (CMP1, CMPn 14), which are connected to the internal control device data bus SPI1, and also in supplying the at least one internal bus interface 14 and the at least one external bus interface 12 of the central integrated safety circuit 10. The required supply voltages may also be generated internally in the respective components of the control device ECU, as a function of a flexible voltage controller concept of the central integrated safety circuit 10. The further supply voltage VZP is also made available to the external interface 12 in the central safety circuit 10. In addition, the filter block FB provides an auxiliary voltage VH, which makes available an ignition current for a central safety semiconductor SH. In addition or as an alternative, the safety semiconductor SH may be supplied from an energy reserve VER. As is further shown in FIG. 2, the safety semiconductor SH makes available to the integrated main system circuit SBC and the integrated system circuits CMP1, CMPn a trigger voltage VFIRE, which is used by the corresponding driver circuits to activate the trigger elements 5. Furthermore, the integrated main system circuit SBC generates a supply voltage VAS buffered by the energy reserve VER for the central safety circuit 10 and the integrated system circuits CMP1, CMPn. As is further shown in FIG. 2, the control device may be activated by way of a wake-up function. To this end, a level converter 4 converts an external wake-up signal WAKE, which is represented for example by a level change, into a corresponding voltage level, which is applied to the external interface 12 in the central safety circuit 10. The external interface 12 then outputs a corresponding enable signal INH to the central integrated safety circuit 10.

As is further shown in FIG. 1, in the depicted exemplary embodiment the internal control device data bus SPI1 is embodied as an SPI data bus (SPI: serial peripheral interface), the main processor μC, as bus master, using corresponding select signals CX_X (chip select) to assign the control device data bus SPI1 to a component coupled to the control device data bus SPI1 for data transmission purposes. These components connected to the control device data bus SPI1 also include, in the depicted exemplary embodiment, n central sensors S1, Sn, of which a first sensor S1 and an $n^{th}$ sensor Sn are depicted, by way of example. The at least one external vehicle data bus 3 is embodied, in the depicted exemplary embodiment, as a CAN data bus. In addition, other suitable wired data buses or wireless data buses are connected to the central safety circuit 10.

Various exemplary embodiments of the central integrated safety circuit 10, 10A, 10B, 10C, 10D, 10E are described below with reference to FIGS. 3 to 7.

As is further shown in FIGS. 3 to 7, in the depicted exemplary embodiments the central integrated safety circuit 10, 10A, 10B, 10C, 10D, 10E in each case comprises a flash memory-free memory device 16 with three memory units 16.1, 16.2, 16.3 and two control circuits 16.4, 16.5 for the three memory units 16.1, 16.2, 16.3. In this case, a first control circuit controls a first memory unit 16.1, which provides a working memory for the auxiliary processor CPU. A second control circuit 16.5 controls a second memory unit 16.2, in which a mask-programmed internal self-testing program and a mask-programmed bootloader program are stored. In addition, program code received from the main processor μC on system startup is stored in the second memory unit 16.2. Moreover, the second control circuit 16.5 controls a third memory unit 16.3, in which program data received from the main processor μC on system startup are stored. Furthermore, the central integrated safety circuit 10, 10A, 10B, 10C, 10D, 10E comprises an internal data bus SPI2, which is likewise embodied as an SPI data bus (SPI: serial peripheral interface), the auxiliary processor CPU and a further interface group 20 comprising at least one parallel readback interface 11 and at least one analog interface 21 and the internal bus interface 14 being connected to the internal data bus SPI2. The at least one parallel readback interface 11 and the at least one analog interface 21 are controlled by a further control circuit 24. In this case, the at least one parallel readback interface is used to output the at least one enable signal DIS, that is to say that, in the depicted exemplary embodiment of the central safety circuit 10, n parallel readback interfaces 11 are present for the n integrated system circuits CMP1, CMPn and one parallel readback interface 11 for the integrated main system circuit SBC. In addition, n analog interfaces 21 are present for receiving analog signals GPIO from the k analog components AK1, AK2, AKn, of which three analog components AK1, AK2, AKn are present by way of example in FIG. 1, or for outputting them to the k analog components AK1, AK2, AKn. To be able to provide different data connections, the central integrated safety circuit 10, 10A, 10B, 10C, 10D, 10E has a data switching matrix 22, which is connected to the internal data bus SPI2 of the safety circuit 10, 10A, 10B, 10C, 10D, 10E, the auxiliary processor CPU, the memory device 16 and to the external bus interface 12.

As is further shown in FIGS. 3 to 6, the external bus interface 12 comprises a transceiver TR1, which receives external data RxD from the at least one external vehicle data bus 3 via the bus lines CANH, CANL and forwards them to the main processor μC and receives internal data TxD from the main processor μC and forwards them to the bus lines CANH, CANL of the at least one external vehicle data bus 3, and a first passive monitoring function CAN-FD, which passively monitors the external data RxD and the internal data TxD and identifies the trigger-relevant information and forwards it to the auxiliary processor CPU. In the depicted exemplary embodiment, the vehicle comprises only the vehicle data bus 3 embodied as a CAN bus. As an alternative, the vehicle data bus 3 may be embodied as a FlexRay data bus or as a LIN data bus or as an Ethernet data bus. It goes without saying that wireless data buses, such as for example a Bluetooth data bus, may additionally or alternatively be used. In certain exemplary embodiments which are not depicted of the control device ECU according to the present invention, the vehicle comprises more than just one vehicle data bus 3. Where a plurality of vehicle data buses 3 are present, the central integrated safety circuit 10 has corresponding external bus interfaces 12 at least for the vehicle data buses 3, which external bus interfaces serve to transmit trigger-relevant information.

As is further shown in FIGS. 3 to 7, the internal bus interface 14 comprises a second passive monitoring function SPI_MON, which passively monitors the data on the at least one control device data bus SPI1 and identifies the trigger-relevant information and forwards it to the auxiliary processor CPU via the internal data bus SPI2.

Figure 3:
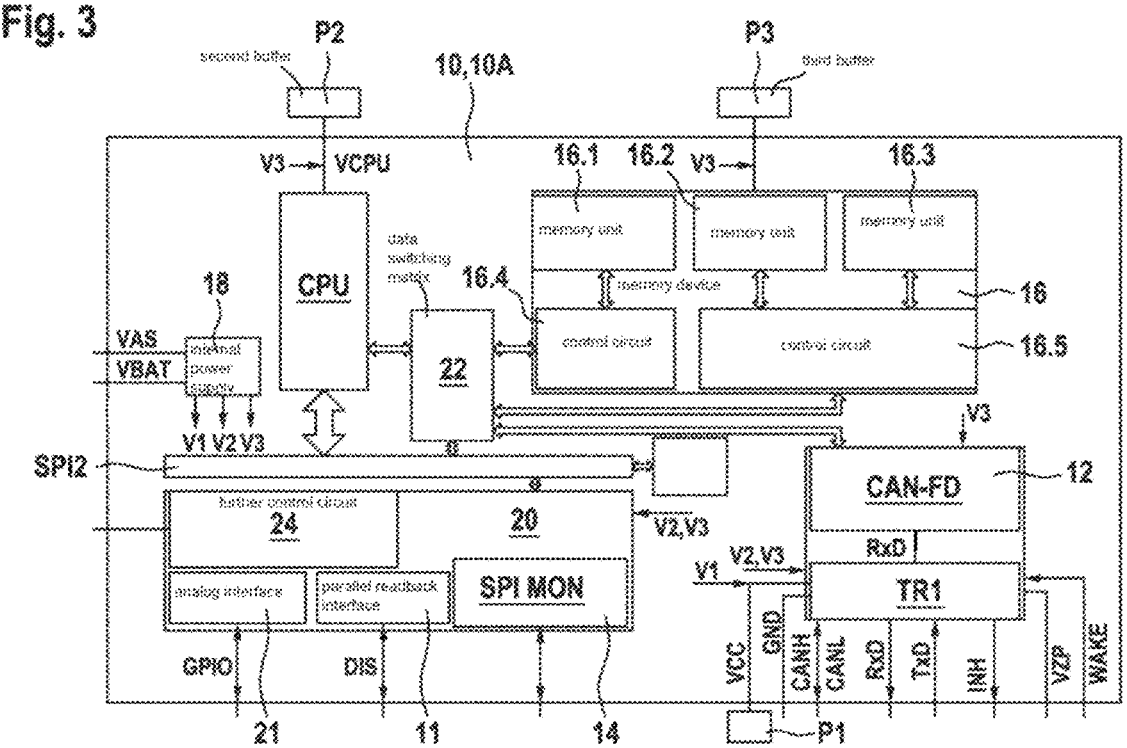
FIGS. 3 to 7 in each case shows a schematic block diagram of an exemplary embodiment of a central integrated safety circuit of the control device according to the present invention for a personal protection system from FIGS. 1 and 2.

As is further shown in FIG. 3, the depicted first exemplary embodiment of the central safety circuit 10A comprises an internal power supply 18, which generates three internal supply voltages V1, V2, V3 for the central safety circuit 10 from the reverse polarity-protected supply voltage VBAT and from the buffered supply voltage VAS from the energy reserve VER. In this respect, a first supply voltage V1 is provided to the transceiver TR1 as a supply voltage VCC buffered by way of a first external buffer P1. A second internal supply voltage V2 and a third supply voltage are provided to the interface group 20 and to the external bus interface. In addition, the third supply voltage V3 is provided to the auxiliary processor CPU as an internal supply voltage VCPU buffered by way of a second buffer P2. In addition, the third supply voltage V3 is provided to the memory device 16 as an internal supply voltage buffered by way of a third buffer P3.

Figure 4:
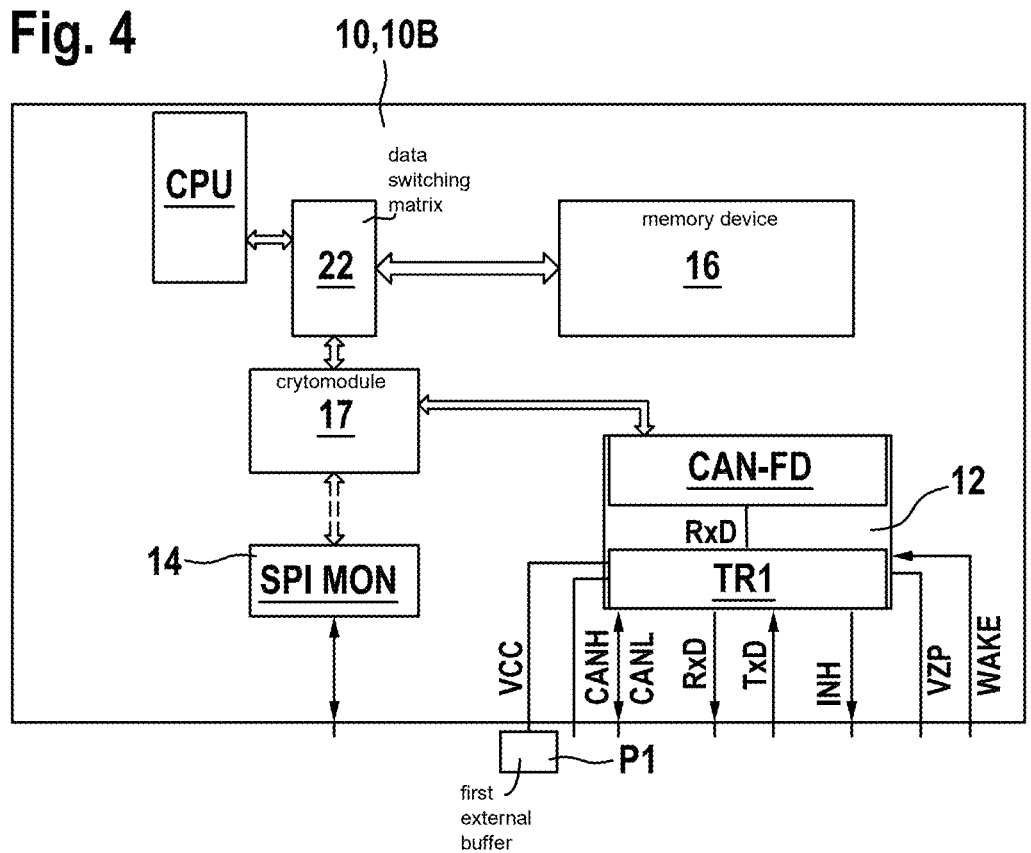

As is further shown in FIG. 4, the depicted second exemplary embodiment of the central safety circuit 10B comprises an autonomous cryptomodule 17, which performs an authentication check of the identified trigger-relevant information, redundantly relative to the main processor μC. As is further shown in FIG. 4, the cryptomodule 17 receives the trigger-relevant information from the first passive monitoring function CAN-FD and from the second passive monitoring function SPI_MON. The authenticated trigger-relevant information is then transmitted to the auxiliary processor CPU via the data switching matrix 22.

Figure 5:
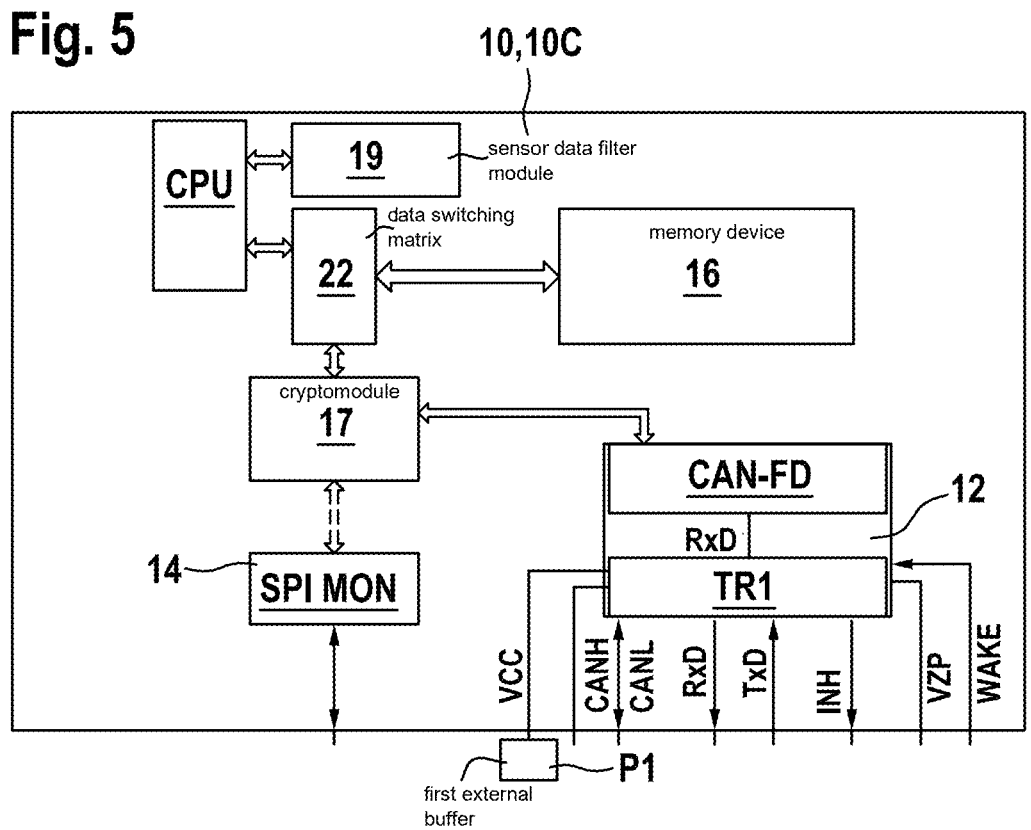

As is further shown in FIG. 5, the depicted third exemplary embodiment of the central safety circuit 10C comprises a sensor data filter module 19, which filters the trigger-relevant information based on sensor data in accordance with specifiable key data. In one exemplary embodiment (not depicted) of the central safety circuit 10C with sensor data filter module 19, the latter does not comprise a cryptomodule 7.

Figure 6:
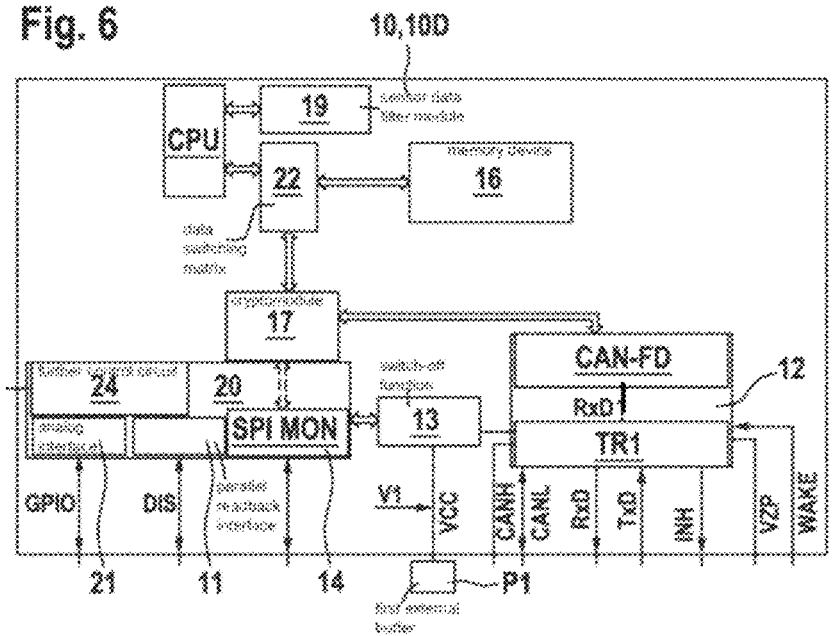

As is further shown in FIG. 6, the depicted fourth exemplary embodiment of the central safety circuit 10D has a switch-off function 13, which switches the transceiver TR1 off in the event of defined bus errors. In this case, actuation of the switch-off function proceeds, with authorization from the main processor μc, via the control device data bus SPI1 and the internal bus interface 14. The switch-off function 13 may be used independently of use of the cryptomodule 17 and/or of the sensor data filter module 19.

Figure 7:
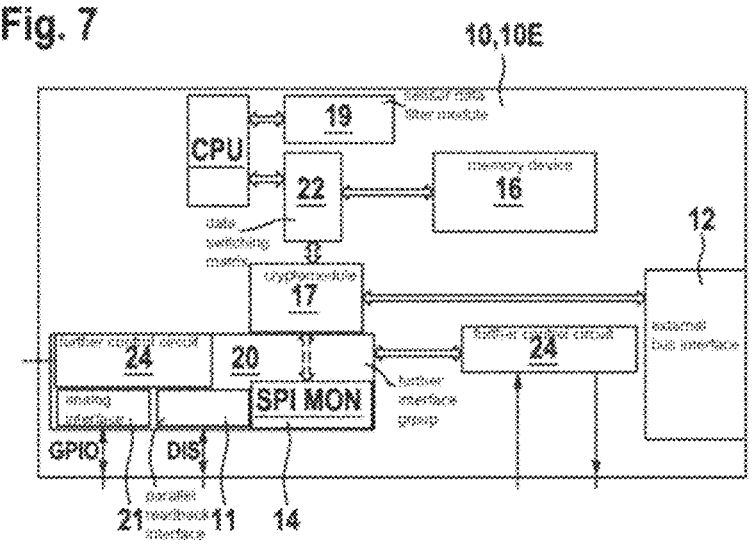

As is further shown in FIG. 7, the depicted fifth exemplary embodiment of the central safety circuit 10E comprises a further control circuit 24, which actuates the central semiconductor safety switch SH in order to adapt the trigger voltage VFIRE for the at least one trigger element 5 in linear or clocked manner to the requirements of the at least one trigger element 5. To this end, the further control circuit 24 receives corresponding current measurement signals, such as for example current voltage values of the auxiliary voltage VH and/or of the energy reserve VER and a setpoint signal of the trigger voltage to be established, and outputs corresponding control signals to the central semiconductor safety switch SH. In this case, actuation of the central semiconductor safety switch SH may be activated by the main processor μC via the control device data bus SPI1. The further control circuit 24 for the central semiconductor safety switch SH may be used independently of use of the cryptomodule 17 and/or of the sensor data filter module 19 and/or of the switch-off function 13.

What is claimed is:

1. A control device for a personal protection system, comprising:
at least one main processor, which is configured to generate and output at least one trigger signal for at least one trigger element of a personal protection device of the personal protection system as a function of trigger-relevant information;
a central safety circuit with an auxiliary processor, which is configured to generate and output at least one enable signal for the at least one trigger element of the personal protection device as a function of the trigger-relevant information;
an integrated main system circuit, which is configured to generate and output, as a function of the at least one trigger signal and the at least one enable signal, at least one actuation signal for triggering the at least one trigger element of the personal protection device; and
at least one control device data bus, via which the main processor communicates with other components of the control device;
wherein the central safety circuit includes at least one external bus interface, via which the main processor communicates with at least one external vehicle data bus, and at least one internal bus interface, which is connected to the at least one control device data bus;
wherein the trigger-relevant information is transmissible via the at least one control device data bus and/or the at least one external vehicle data bus; and
wherein each of the at least one external bus interface and the at least one internal bus interface being configured to passively monitor data communicated via the at least one external vehicle data bus or the at least one control device data bus, and to identify the trigger-relevant information and additionally transmit the trigger-relevant information to the auxiliary processor for evaluation.

2. The control device as recited in claim 1, wherein the integrated main system circuit is further configured to generate at least one internal system voltage of the control device.

3. The control device as recited in claim 1, wherein at least one integrated system circuit is present as a further component of the control device and is connected to the at least one control device data bus, the at least one integrated system circuit being configured to generate and output, as a function of the at least one trigger signal and the at least one enable signal, at least one further actuation signal for triggering at least one further trigger element of the personal protection device.

4. The control device as recited in claim 3, wherein at least one of the integrated main system circuit or the at least one integrated system circuit includes at least one peripheral sensor interface, which is configured to receive and condition sensor signals from at least one peripheral sensor.

5. The control device as recited in claim 1, wherein the central safety circuit includes a flash memory-free memory device with at least one memory unit, which is configured to store an internal self-testing system and/or bootloader program and/or program code received from the main processor on system startup and to provide a working memory for the at least one auxiliary processor.

6. The control device as recited in claim 1, wherein the at least one external bus interface includes a transceiver, which is configured to receive external data from the at least one external vehicle data bus and forward the received external data to the main processor and to receive internal data from the main processor and forward the received internal data to the at least one external vehicle data bus, and a first passive monitoring function, which is configured to passively monitor the external data and the internal data and identify the trigger-relevant information and forward the trigger-relevant information to the auxiliary processor.

7. The control device as recited in claim 6, wherein the central safety circuit includes a switch-off function which is configured to switch off the transceiver in the event of defined bus errors.

8. The control device as recited in claim 1, wherein the at least one external vehicle data bus is: i) a wired data bus including a CAN data bus or a FlexRay data bus or a LIN data bus or an Ethernet data bus, or ii) a wireless data bus including a Bluetooth data bus.

9. The control device as recited in claim 1, wherein the at least one internal bus interface includes a second passive monitoring function, which is configured to passively monitor data on the at least one control device data bus and to identify the trigger-relevant information and forward the trigger-relevant to the auxiliary processor.

10. The control device as recited in claim 1, wherein the central safety circuit includes an autonomous cryptomodule which is configured to perform an authentication check of the identified trigger-relevant information, redundantly relative to the main processor.

11. The control device as recited in claim 1, wherein the central safety circuit includes an internal power supply which is configured to generate at least one internal supply voltages for the central safety circuit from a reverse polarity-protected supply voltage and/or from a buffered supply voltage from an energy reserve.

12. The control device as recited in claim 1, wherein the central safety circuit includes a sensor data filter module which is configured to filter the trigger-relevant information based on sensor data in accordance with specifiable key data.

13. The control device as recited in claim 1, wherein the central safety circuit includes a control circuit which is configured to actuate a central semiconductor safety switch to adapt a trigger voltage for the at least one trigger element in linear or clocked manner to requirements of the at least one trigger element.

14. The control device as recited in claim 1, wherein the central safety circuit includes at least one parallel readback interface, which is configured to output the at least one enable signal.

15. The control device as recited in claim 1, wherein the central safety circuit includes at least one analog interface which is configured to receive or output at least one analog signal.

* * * * *